J. SCHNEIDER.

Apparatus for Producing Extract of Hops, &c.

No. 55,915.

Patented June 26, 1866.

Witnesses:
At. O'Neill
Louis Heypeden.

Inventor:
John Schneider.

UNITED STATES PATENT OFFICE.

JOHN SCHNEIDER, OF WILLIAMSBURG, NEW YORK.

IMPROVED APPARATUS FOR PRODUCING EXTRACT OF HOPS, &c.

Specification forming part of Letters Patent No. 55,915, dated June 26, 1866.

*To all whom it may concern:*

Be it known that I, JOHN SCHNEIDER, of Williamsburg, in the county of Kings and State of New York, have invented a new and Improved Apparatus for Producing an Extract of Hops, &c.; and I do hereby declare that the following is a full, clear, and exact description thereof, which will enable others skilled in the art to make and use the same, reference being had to the accompanying drawings, forming part of this specification, in which—

Figure 1:
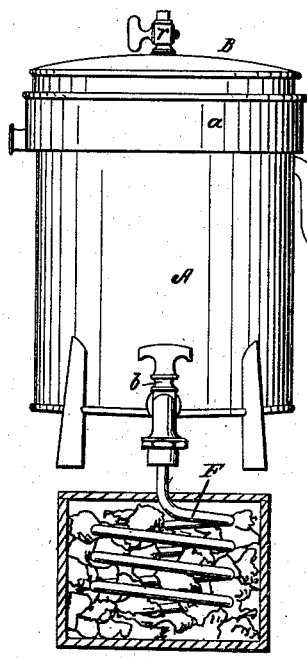
Figure 2:
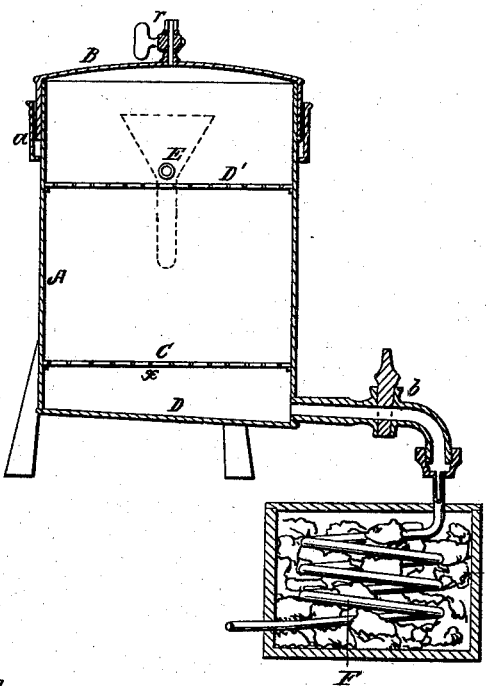
Figure 3:
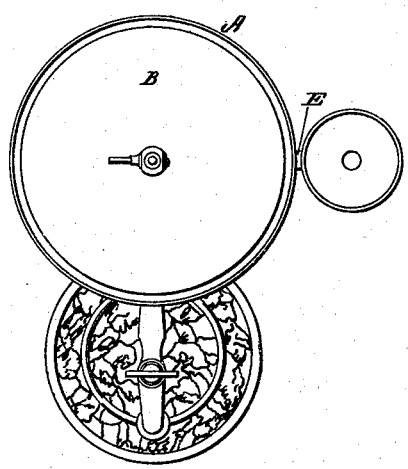

Figure 1 represents a side elevation of this invention. Fig. 2 is a vertical central section of the same. Fig. 3 is a plan or top view of the same.

Similar letters of reference indicate like parts.

This invention relates to an apparatus which consists of a vessel or still with an air-tight cover and provided with a perforated bottom, in combination with a siphon-tube, through which the heated malt-extract or other menstruum is introduced, and with a coil which serves to cool the extract as the same passes out of the vessel in such a manner that all the aroma contained in the hops or other material to be extracted is preserved, and a strong extract is obtained from a comparatively small quantity of hops or other material.

A represents a vessel made of wood or any other suitable material, in a cylindrical or any other desirable form or shape. The vessel is provided at its top edge with a trough, *a*, to receive water or other fluid, and to form a liquid joint with the cover B, causing the same to close down air-tight. A cock, *r*, in said cover serves to blow off the air or vapors from the vessel A. The hops or other material to be extracted are introduced into the vessel A, which is provided with a perforated false bottom, C, at a certain distance above its real bottom D, and with a perforated horizontal partition, D′, which serves to spread the menstruum equally over the material to be extracted.

E is a siphon-tube with a bell-shaped mouth, through which the menstruum is introduced above the partition D′, and a coil, F, which connects with the bottom part of the vessel A, serves to carry off the extract, a suitable stop-cock, *b*, being provided to draw off the contents of the vessel A at the proper time. Said coil may be placed in a tub with ice, so that the liquid running through the same from the vacuum-chamber *x* may be cooled.

In using this apparatus for making an extract of hops, I introduce the boiling wort or extract of malt through the siphon-tube E, and as the same comes in contact with the hops the essence or strength thereof is extracted and carried down through the perforated bottom into the space between said perforated bottom and the real bottom D, whence it is drawn off by the stop-cock *b* and coil F.

By this arrangement all the aroma of the hops is retained in the extract, since the cover is closed air-tight, and the siphon-tube being filled with the menstruum, the escape of vapors from the interior of the vessel is thereby prevented.

This apparatus is very simple in its construction, it is easily operated, and it is very valuable, particularly to brewers, though it can also be used for making extract of any other description in which it is desirable to prevent the escape of vapors.

What I claim as new, and desire to secure by Letters Patent, is—

The siphon-tube E, in combination with the tightly-closed vessel A, which is provided with a horizontal partition or spurger, D′, false bottom C, and discharge-coil F, substantially as and for the purpose described.

In testimony whereof I have hereunto set my signature.

JOHN SCHNEIDER.

Witnesses:
A. NEILL,
LOUIS HUPEDEN.